US012619900B2

(12) United States Patent
Okamoto

(10) Patent No.: US 12,619,900 B2
(45) Date of Patent: May 5, 2026

(54) ORGANIC MOLECULE VIBRATION SPECTRUM ANALYSIS USING COMBINATORIAL OPTIMIZATION AND AN ISING MODEL

(71) Applicant: NEC Corporation, Tokyo (JP)

(72) Inventor: Yasuharu Okamoto, Tokyo (JP)

(73) Assignee: NEC CORPORATION, Tokyo (JP)

(*) Notice: Subject to any disclaimer, the term of this patent is extended or adjusted under 35 U.S.C. 154(b) by 1087 days.

(21) Appl. No.: 17/694,796

(22) Filed: Mar. 15, 2022

(65) Prior Publication Data

US 2022/0309378 A1 Sep. 29, 2022

(30) Foreign Application Priority Data

Mar. 26, 2021 (JP) ................................ 2021-054369

(51) Int. Cl.
*G06N 10/60* (2022.01)
*G06N 10/20* (2022.01)

(52) U.S. Cl.
CPC ............ *G06N 10/60* (2022.01); *G06N 10/20* (2022.01)

(58) Field of Classification Search
None
See application file for complete search history.

(56) References Cited

U.S. PATENT DOCUMENTS

| | | | | |
|---|---|---|---|---|
| 2008/0235167 | A1 | 9/2008 | Beratan et al. | |
| 2010/0191517 | A1 | 7/2010 | Blundell et al. | |
| 2015/0362425 | A1 | 12/2015 | Goldsmith et al. | |
| 2018/0096112 | A1 | 4/2018 | Blundell et al. | |
| 2020/0381078 | A1* | 12/2020 | Ohfuchi ................. | G16B 15/00 |

FOREIGN PATENT DOCUMENTS

| | | | |
|---|---|---|---|
| JP | 2003-256668 | A | 9/2003 |
| JP | 2010-539580 | A | 12/2010 |
| JP | 2020-194487 | A | 12/2020 |

OTHER PUBLICATIONS

JP Office Action for JP Application No. 2021-054369, mailed on Mar. 11, 2025 with English Translation.

* cited by examiner

*Primary Examiner* — G. Steven Vanni
(74) *Attorney, Agent, or Firm* — Sughrue Mion, PLLC

(57) ABSTRACT

To provide an analysis apparatus an analysis method, and an analysis program each adapted to extract information about the molecular structures from the molecular vibration spectra. An analysis device includes an acquisition unit configured to analyze, by applying a combinatorial optimization technique using the Ising model, a molecular vibration spectrum of each of a plurality of organic molecules including a plurality of first organic molecules and second organic molecule serving as a reference for analyzing a molecule structure of each of the plurality of the first organic molecules, and to acquire information about a molecular structure of each of the plurality of the first organic molecules.

9 Claims, 4 Drawing Sheets

ORGANIC MOLECULE VIBRATION SPECTRUM ANALYSIS USING COMBINATORIAL OPTIMIZATION AND AN ISING MODEL

INCORPORATION BY REFERENCE

This application is based upon and claims the benefit of priority from Japanese patent application No. 2021-054369, filed on Mar. 26, 2021, the disclosure of which is incorporated herein in its entirety by reference.

TECHNICAL FIELD

The present disclosure relates to an analysis method, an analysis method, and an analysis program, in particular, to combinatorial optimization using the Ising model.

BACKGROUND ART

Measurement data of molecular vibration spectra of organic molecules is usually divided into two separate regions bordered at 1500 $cm^{-1}$. The region from 600 to 1500 $cm^{-1}$ is called a fingerprint region. Since the fingerprint region has a complex pattern derived from deformation variation and single-bond stretching vibration, it is difficult to distinguish functional groups from individual peaks included in the fingerprint region. However, since each organic molecule has an intrinsic molecular vibrational spectrum in the fingerprint region, it is possible to identify the molecular structure of each organic molecule by comparing the molecular structure of each organic molecule with the molecular structures of known organic molecules.

The region between 1500 and 4000 $cm^{-1}$, on the other hand, is called a diagnostic region. The diagnostic region includes information useful in interpreting molecular structures, such as the peak derived from a double bond of around 1700 $cm^{-1}$, such as C═O, C═C, C═N, and the peak derived from a triple bond of around 2200 $cm^{-1}$, such as C≡C. On the other hand, a strong absorption peak of around 200 $cm^{-1}$ in the region of 3000 $cm^{-1}$ is derived from a C—H bond. However, since almost all organic molecules have a C—H bond, the absorption peak is not considered important in interpreting the molecule structures.

Identification of organic molecules is performed by combining analysis of the molecular vibration spectrum with various analysis methods such as the mass spectrum analysis, the nuclear magnetic resonance method, and the like. Here, the mass spectrum analysis can be used to analyze the molecular weight and the molecular formula of the organic molecules. Further, the nuclear magnetic resonance method can be used to analyze the bonding state between carbon atoms and information about the neighboring carbon atoms.

On the other hand, a technique of solving combinatorial optimization problems using the Ising model has recently been the focus of attention. Japanese Unexamined Patent Application Publication No. 2020-194487 discloses a technique of searching for stable structures of protein using a technique such as quantum annealing.

SUMMARY

In order to reduce the burden of performing analysis in addition to the molecular vibration spectra analysis, it is desired to extract as much information as possible on the molecular structure from the molecular vibration spectra.

The present disclosure has been made to solve the problem mentioned above. That is, the present disclosure provides an analysis device, an analysis method, and an analysis program each adapted to extract information about the molecular structures from the molecular vibration spectra.

An analysis device according to the present disclosure includes an acquisition unit configured to analyze, by applying a combinatorial optimization technique using the Ising model, a molecular vibration spectrum of each of a plurality of organic molecules including a plurality of first organic molecules and a second organic molecule serving as a reference for analyzing a molecule structure of each of the plurality of the first organic molecules, and to acquire information about a molecular structure of each of the plurality of the first organic molecules.

An analysis method according to the present disclosure includes causing a computer to execute the processes of:

analyzing, by applying a combinatorial optimization technique using the Ising model, a molecular vibration spectrum of each of a plurality of organic molecules including a plurality of first organic molecules and a second organic molecule serving as a reference for analyzing a molecule structure of each of the plurality of the first organic molecules; and acquiring information about a molecular structure of each of the plurality of the first organic molecules.

An analysis program according to the present disclosure causes a computer to execute the processes of:

analyzing, by applying a combinatorial optimization technique using the Ising model, a molecular vibration spectrum of each of a plurality of organic molecules including a plurality of first organic molecules and second organic molecule serving as a reference for analyzing a molecule structure of each of the plurality of the first organic molecules; and acquiring information about a molecular structure of each of the plurality of the first organic molecules.

BRIEF DESCRIPTION OF DRAWINGS

The above and other objects, features and advantages of the present disclosure will become more fully understood from the detailed description given hereinbelow and the accompanying drawings which are given by way of illustration only, and thus are not to be considered as limiting the present disclosure.

EXAMPLE EMBODIMENT

First Example Embodiment

Figure 1:
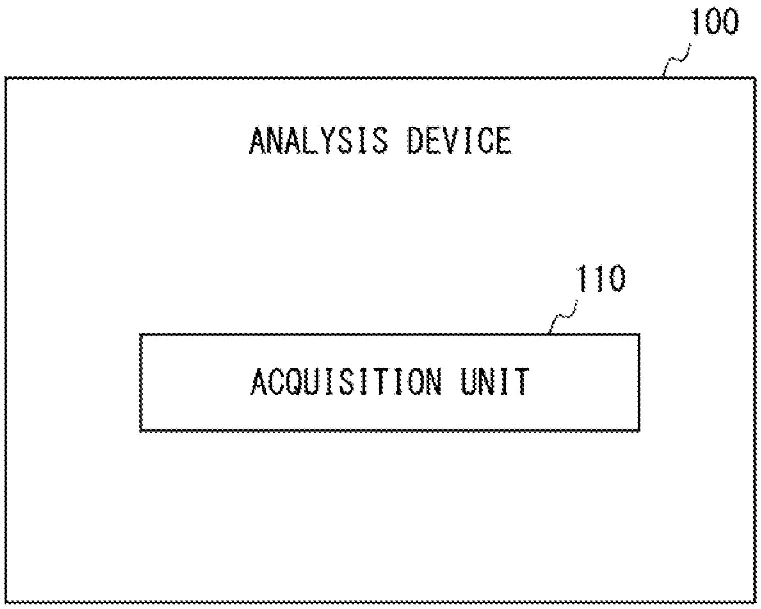
FIG. 1 is a block diagram showing a structure of an analysis device according to a first example embodiment.

Hereinbelow, example embodiments of the present disclosure will be described with reference to the drawings. In the drawings, since the drawings are simplified, the technical scope of the example embodiments should not be narrowly construed on the basis of the description in these drawings.

The identical reference symbols denote identical structural elements and the redundant explanations thereof are omitted.

FIG. 1 is a block diagram showing a configuration of an analysis device 100 according to a first example embodiment. The analysis device 100 includes an acquisition unit 110. The acquisition unit 110 analyzes the molecular vibration spectra of a plurality of organic molecules including a plurality of first organic molecules and a second organic molecule that serve as a reference for analyzing the molecule structure of each of the plurality of the first organic molecules. Each of the plurality of organic molecules may be, for example, an open chain compound with a main chain (main skeleton).

A plurality of first organic molecules is the target of the molecular structure analysis. The acquisition unit 110 analyzes the degree of a predetermined property of the molecular structure of each of the plurality of the first organic molecules. A predetermined property refers to, for example, linearity and branching. A predetermined property may be a property related to the carbon number of the main chain (the main chain carbon number). A property related to the main chain carbon number is, specifically, a property of having a large carbon number in the main chain or a property of having a small carbon number in the main chain. Here, the property of having a large carbon number in the main chain or the property of having a small carbon number in the main chain may be determined based on the second organic molecule. A predetermined property may be a quantifiable property such as a property related to the carbon number in the main chain.

Specifically, the second organic molecule serves as a reference for analyzing the degree of the predetermined property of the molecule structure of each of the plurality of the first organic molecules. The second organic molecule may be, for instance, an organic molecule with the predetermined property stronger than that of each of the plurality of the first organic molecules. Further, the second organic molecule may be an organic molecule with the predetermined property weaker than that of each of the plurality of the first organic molecules. For instance, the second organic molecule is an organic molecule with linearity stronger than that of each of the plurality of the first organic molecules or weaker than that of each of the plurality of the first organic molecules. Further, for example, the second organic molecule is an organic molecule with a branching property stronger than that of each of the plurality of the first organic molecules or weaker than that of each of the plurality of the first organic molecules. Further, the second organic molecule may be an organic molecule having a carbon number in the main chain that is larger than that of each of the plurality of the first organic molecules.

As already mentioned above, the acquisition unit 110 analyzes the molecular vibration spectra of the plurality of organic molecules including the aforementioned plurality of the first organic molecules and the second organic molecule. Then, the acquisition unit 110 analyzes the molecular vibration spectra of the plurality of organic molecules by applying the combinatorial optimization technique using the Ising model and acquires information about the molecular structure of each of the plurality of the first organic molecules. The combinatorial optimization technique using the Ising model is a method of searching for the state where the energy of the Hamiltonian expressed as a quadratic equation of 0-1 binary variables is minimized. Here, the acquisition unit 110 may perform analysis such that the more similar the molecular vibration spectra of the organic molecules are with one another, the closer the similarity of the molecular structures (i.e., the degree of the predetermined property) of the organic molecules with one another.

For example, the acquisition unit 110 is able to acquire, using the aforementioned method, a permutation of a plurality of the first organic molecules in the order of increasing strength of the predetermined property or in the order of weakening strength of the predetermined property with the second organic molecule at the head of the permutation. In this case, the acquisition unit 110 is able to acquire information about the order in which the predetermined property of each of the plurality of the first organic molecules gets stronger or the order in which the predetermined property of each of the plurality of the first organic molecules gets weaker. That is, the acquisition unit 110 is able to acquire information about the order relation (the strong-weak relation, the large-small relation) between the degrees of the predetermined property of the plurality of the first organic molecules.

Note that the plurality of the first organic molecules may include an organic molecule with unspecified molecular structure and an organic molecule with specified molecular structure. In such case, the degree of the predetermined property of the organic molecule for which the molecular structure has not been specified can be evaluated based on the degree of the predetermined property of the organic molecule for which the molecular structure has been specified.

The analysis device according to the first example embodiment analyzes the molecular vibration spectra by applying the combinatorial optimization technique using the Ising model and acquires information about the molecular structure of each of the plurality of the first organic molecules that are the target of analysis. Therefore, the analysis device according to the first example embodiment can extract information about the molecular structures by analyzing the molecular vibration spectra.

Figure 2:
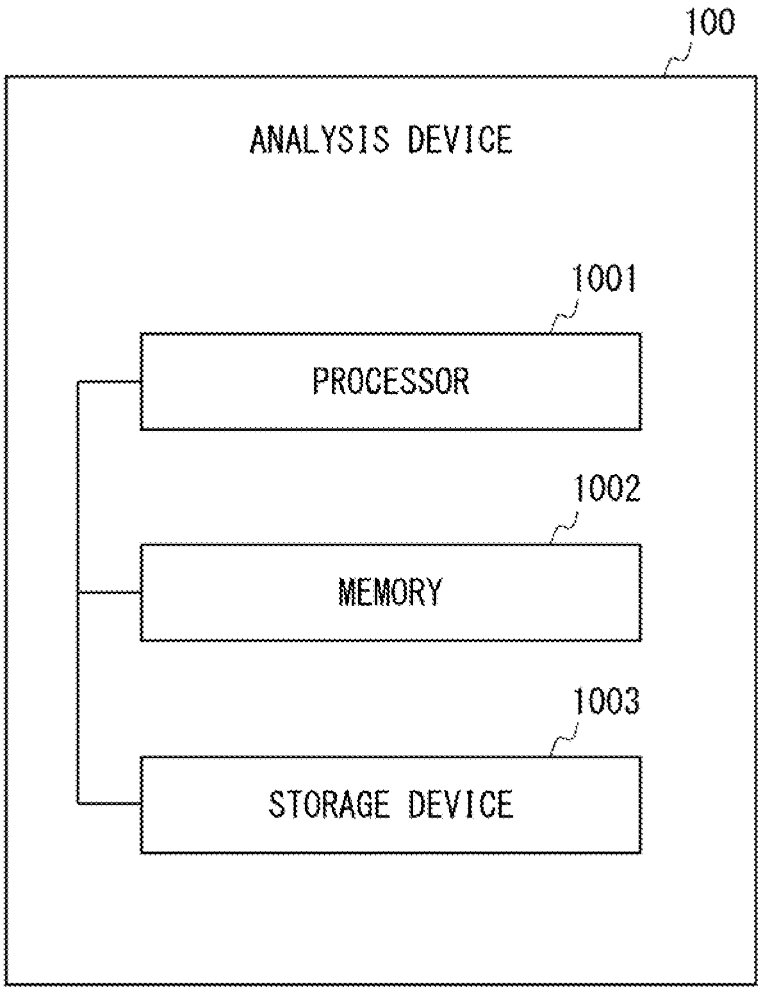
FIG. 2 is a block diagram showing an example of a hardware configuration of the analysis device according to the first example embodiment.

FIG. 2 is a diagram showing an example of a hardware configuration of the analysis device 100. The analysis device 100 includes a processor 1001, a memory 1002, and a storage device 1003. The storage device 1003 stores a computer program by which the processes of the analysis method according to the first example embodiment is implemented. Then, the processor 1001 causes the computer program to be read from the storage device 1003 to the memory 1002 and executes the computer program. By this configuration, the processor 1001 realizes the function of the acquisition unit 110.

Further, the acquisition unit 110 may be realized by an exclusive hardware. Further, a part or all of the acquisition unit 110 may be realized by a general-purpose or an exclusive circuitry, a processor, or the like, or a combination thereof. These elements may be configured of a single chip or a plurality of chips connected via a bus. A part or all of the acquisition unit 110 may be realized by combination of the aforementioned circuits and the like and the program. Further, as a processor, a CPU (Central Processing Unit), a GPU (Graphics Processing Unit), FPGA (Field Programmable Gate Array), or the like may be employed. Further, the analysis device 100 may also include an unillustrated quantum chip that performs quantum annealing.

Further, when a part or all of the acquisition unit 110 is realized by a plurality of information processing apparatuses, circuits, and the like, the plurality of the information processing apparatuses, the circuits, and the like may be located in a centralized manner or in a distributed manner. For example, the information processing apparatuses, the circuits, and the like may be realized in a configuration in which the components are connected with one another via a communication network such as a client server system, a cloud computing system, and the like. Further, the function of the analysis device 100 may be provided in a form of SaaS (Software as a Service).

Second Example Embodiment

Figure 3:
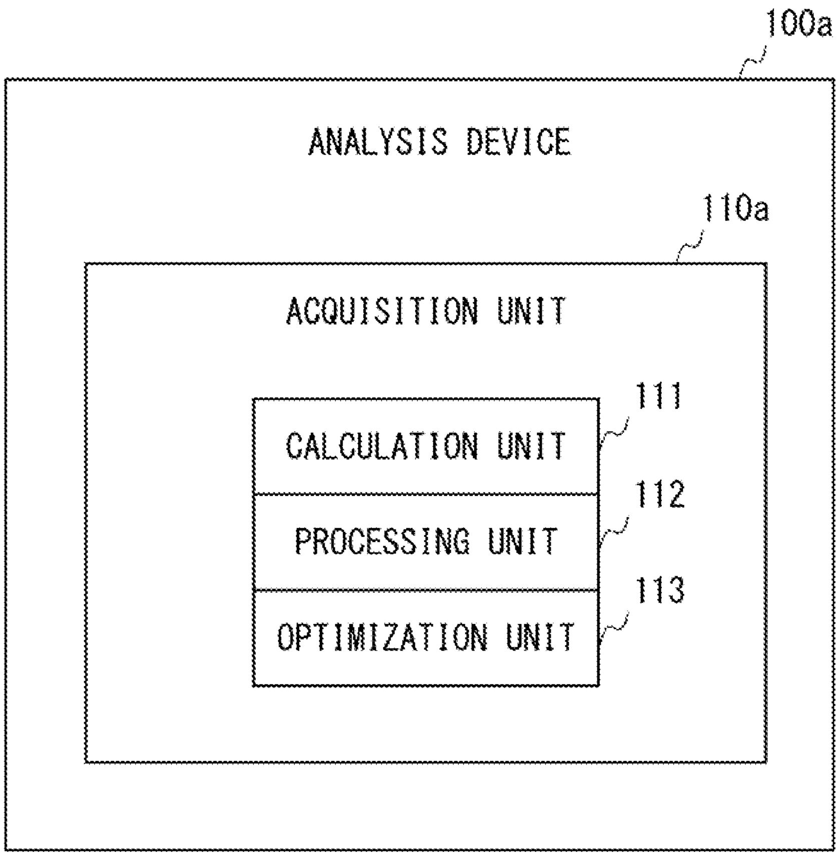
FIG. 3 is a block diagram showing a configuration of an analysis device according to a second example embodiment.

A second example embodiment is a specific example of the first example embodiment. In the description below, the parts that overlap those of the first example embodiment are omitted. FIG. 3 is a configuration diagram showing a configuration of an analysis device 100a according to the second example embodiment. The analysis device 100a includes an acquisition unit 110a. The acquisition unit 110a is an example of the aforementioned acquisition unit 110. The acquisition unit 110a includes a calculation unit 111, a processing unit 112, and an optimization unit 113.

The acquisition unit 110a analyzes the molecular vibration spectra of the plurality of organic molecules including the plurality of the first organic molecules and the second organic molecule that serve as a reference. The predetermined property of the second organic molecule is stronger than that of each of the plurality of the first organic molecules. Alternatively, the predetermined property of the second organic molecule is weaker than that of each of the plurality of the first organic molecules.

The calculation unit 111 generates a similarity matrix representing the degree of similarity (the rating values of similarity) among the molecular vibration spectra of the plurality of organic molecules. In other words, the similarity matrix represents the degrees of similarity each being a degree of similarity between the molecular vibration spectra of two organic molecules. When the number of the molecular vibration spectrum (the number of the plurality of organic molecules) is N, the similarity matrix is N×N matrix. When the molecular vibration spectra are from $S_1$ to $S_N$, the component (i, j) of the similarity matrix represents the similarity between $S_1$ and $S_j$.

The range of the wave number of the molecular vibration spectra may be in the range of 2800 to 3200 $cm^{-1}$. According to the molecular vibration spectrum analysis, a strong absorption peak falling within the range around 200 $cm^{-1}$ in the region of 3000 $cm^{-1}$ is derived from a C—H bond. Since almost all organic compounds have a C—H bond, the absorption peak has not been considered important in the analysis of the molecular structures. The analysis device 100a is able to acquire information about the molecular structures based on the molecular vibration spectra of the wavenumber range around 200 $cm^{-1}$ in the region of 3000 $cm^{-1}$.

Here, the calculation unit 111 may calculate the degrees of similarity among the molecular vibration spectra of the plurality of organic molecules using the DTW (Dynamic Time Warping). The calculation unit 111 calculates, using the DTW, the degrees of similarity among the molecular vibration spectra of the organic molecules, for N(N−1)/2 pairs formed by taking out two different organic molecules from N number of organic molecules. DTW is a method for calculating the similarity among time series data, and by reading time as the wavenumber (the frequency), the similarity of the molecular vibration spectra among the spectra data can be evaluated. The similarity matrix is generated based on the result of the calculation of the degrees of similarity.

The processing unit 112 formulates the Hamiltonian H for setting the order of the plurality of organic molecules so that the higher the degree of similarity between the molecular vibration spectra of organic molecules, the more closely the organic molecules are aligned. In other words, the processing unit 112 determines the permutation in which the plurality of the organic molecules are aligned such that the higher the degree of similarity between the molecular vibration spectra of the organic molecules, the more closely the organic molecules are aligned. The permutation to be determined represents the relative similarity among the plurality of the organic molecules. The Hamiltonian H formulated by the processing unit 112 is exemplified by Expression 1. The number of the plurality of the organic molecules is N, and each of the plurality of the organic molecules is assigned a number between 1 to N in advance. That is, each of the plurality of the organic molecules is distinguished by a number between 1 to N.

[Expression 1]

$$H = A\sum_{i=1}^{N}\left(\sum_{j=1}^{N}x_{ij} - 1\right)^2 + A\sum_{j=1}^{N}\left(\sum_{i=1}^{N}x_{ij} - 1\right)^2 + \tag{1}$$

$$B\sum_{i=1}^{N}\sum_{j=1}^{N}\sum_{k=1}^{N}\sum_{l=1}^{N}d_{ij}*f(k,l)*x_{ik}*x_{jl} + C\sum_{x_{ij}\in S_{peg}}(x_{ij}-1)^2$$

$x_{ik}$ is a binary variable set to the i-th organic molecule (the organic molecule distinguished by the number i, hereinafter expressed as "ID-i organic molecule") which becomes 1 when the order in the permutation is k-th and becomes 0 otherwise. $d_{ij}$ is (i, j) the component of the similarity matrix, and expresses the rating value of the similarity (the degree of similarity) between the organic molecule of ID-i (the organic molecule distinguished by the number i) and the organic molecule of ID-j (the organic molecule distinguished by the number j). f(k,l) is a value close to 1 when k and l are in proximity to each other and is a value close to 0 when k and l are distant from each other. f(k, l) is, for example, Gaussian function. $S_{peg}$ represents a set of organic molecules whose order in the permutation is fixed. The aforementioned second organic molecule is included in $S_{peg}$.

The first term on the right-hand side of Expression 1 expresses the restriction that each of the organic molecules distinguished by ID-1 to ID-N is always allocated one of the orders in the permutation. The second term on the right-hand side of Expression 1 expresses the restriction that each of 1st to N-th elements in the permutation is always allocated one of the organic molecules.

The third term on the right-hand side of Expression 1 corresponds to the objective function in the combinatorial optimization problem. As described above, f(k, l) is a function for determining the strength of correlation between the order k and the order l in the permutation. Here, by reading f(k, l)=$\delta_{k,l}$+1, and $d_{i,j}$ as the distance between the vertex i and the vertex j, the Hamiltonian H corresponds to the formulation of the Traveling Salesperson Problem (TPS) by the Ising model. In TPS, only the distances between a certain vertex and the vertices visited before and after the certain vertex are taken into account, but in the Hamiltonian H, vertices other than the vertices visited before and after the certain vertex may be taken into account. By this configuration, the analysis device 100a may be able to set a more appropriate order. The third term on the right-hand side of Expression 1 may take into account the distances (the similarities) among all vertices.

As described above, f(k, l) is, for example, the Gaussian function $f(k, l)=\exp\{-\alpha^*(k-l)^2\}$. Here, $\alpha$ is a hyper parameter. An appropriate value may be set for a based on the result of optimization actually performed using candidate values. By using a function like in the Gaussian function which rapidly decays to 0 as the difference between k and l increases, calculation by the optimization unit 113 to be described later can be stabilized. By minimizing the sum of degree of similarity $d_{ij}$ weighted by f(k,l), the molecules whose molecular vibration spectra are similar to one another are aligned closely in the permutation.

The fourth term on the right-hand side of Expression 1 expresses the restriction that the order of the organic molecule included in $S_{peg}$ is fixed. The fourth term on the right-hand side of Expression 1 may be a restriction that the second organic molecule is fixed at the head of the permutation.

The optimization unit 113 optimizes the Hamiltonian H that has been formulated by the processing unit 112. Accordingly, the optimization unit 113 acquires information about the molecular structure of each of the plurality of the first organic molecules. When the predetermined property of the second organic molecule is strong, the information about the order in which the predetermined property becomes weaker among the plurality of the first organic molecules may be acquired. Further, when the predetermined property of the second organic molecule is weak, the information about the order in which the predetermined property becomes stronger among the plurality of the first organic molecules may be acquired.

The optimization unit 113 may optimize the Hamiltonian H using simulated annealing or tabu search. The optimization unit 113 may be an exclusive hardware for searching the optimum solution for the combinatorial optimization problem using simulated annealing. Further, the optimization unit 113 may be a quantum computer for searching the combinatorial optimization problem for the optimization problem by quantum annealing. The optimization unit 113 does not necessarily have to find the optimal solution using the Hamiltonian H and only needs to find a solution for the case where the value of the Hamiltonian H decreases.

Figure 4:
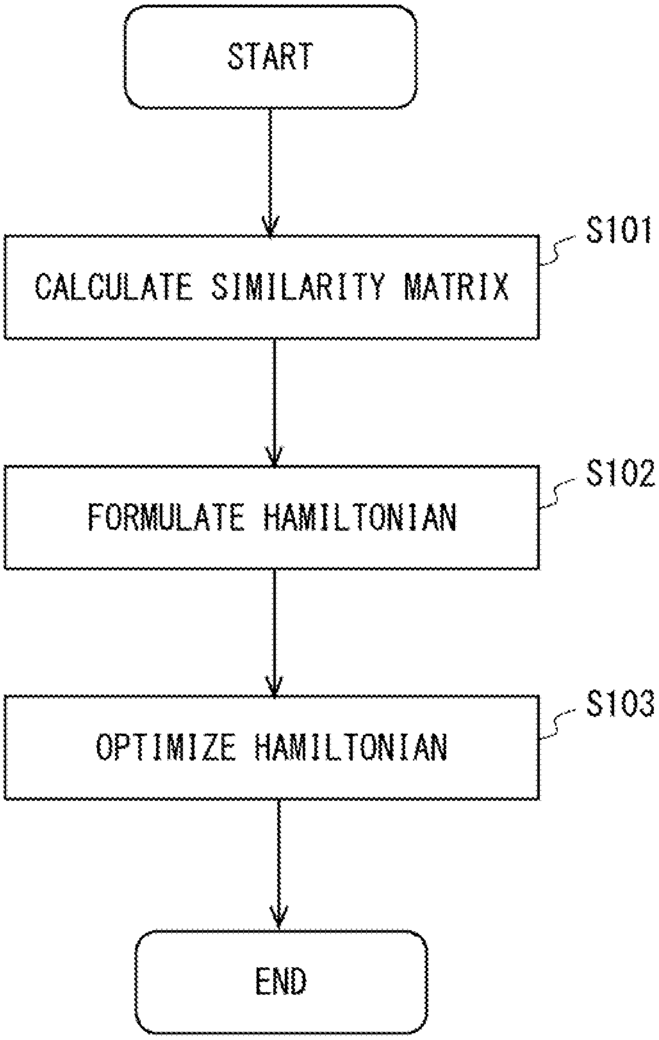
FIG. 4 is a flowchart showing a flow of analysis method according to the second example embodiment.

FIG. 4 is a flowchart showing an operation of the analysis device 100*a* according to the second example embodiment. First, the calculation unit 111 of the analysis device 100*a* calculates the similarity matrix expressing degrees of similarity among the molecular vibration spectra of the plurality of organic molecules (Step S101). As described above, the plurality of organic molecules include the second organic molecule having the predetermined property that is stronger or weaker than that of the plurality of the first organic molecules and serving as a reference of analysis.

Next, the processing unit 112 of the analysis device 100*a* formulates, based on the similarity matrix formed in Step S101, the Hamiltonian for setting the order of the plurality of organic molecules such that the higher the degree of similarity between the molecular vibration spectra of the organic molecules, the more closely the organic molecules are aligned each another (Step S102). Here, the order is set based on the second organic molecules. Specifically, the order is set with the second organic molecule at the head of the permutation. In other words, the permutation in which a plurality of organic molecules are aligned with the second organic molecule at the head of the permutation is determined.

Lastly, the optimization unit 113 of the analysis device 100*a* optimizes the Hamilton formulated in Step S102 (Step S103). By this configuration, information about the degree of the predetermined property of the molecular structure of each of the plurality of the first organic molecules is acquired.

Next, using the molecular vibration spectrum of each of the 18 isomers of octane (C8H8), the result of the aforementioned analysis method, verified by the inventor of the present disclosure, will be described. The structural formulae 1 to 18 express 18 kinds of isomers of octane.

[Chemical Formula 1]

(1)

$CH_3CH_2CH_2CH_2CH_2CH_2CH_2CH_3$

[Chemical Formula 2]

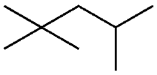

(2)

$(CH_3)_3CCH_2CH(CH_3)_2$

[Chemical Formula 3]

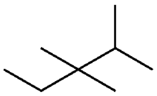

(3)

$CH_3CH_2C(CH_3)_2CH(CH_3)_2$

[Chemical Formula 4]

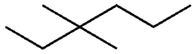

(4)

$CH_3CH_2C(CH_3)_2CH_2CH_2CH_3$

[Chemical Formula 5]

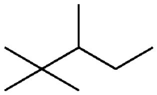

(5)

$(CH_3)_3CCH(CH_3)CH_2CH_3$

[Chemical Formula 6]

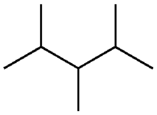

(6)

$(CH_3)_2CHCH(CH_3)CH(CH_3)_2$

[Chemical Formula 7]

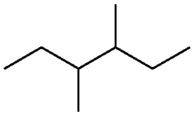

(7)

$CH_3CH_2CH(CH_3)CH(CH_3)CH_2CH_3$

-continued

[Chemical Formula 8]

(8)

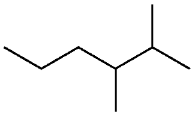

$CH_3CH_2CH_2CH(CH_3)CH(CH_3)_2$

[Chemical Formula 9]

(9)

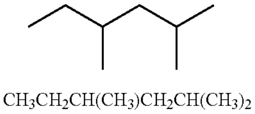

$CH_3CH_2CH(CH_3)CH_2CH(CH_3)_2$

[Chemical Formula 10]

(10)

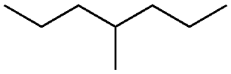

$CH_3CH_2CH_2CH(CH_3)CH_2CH_2CH_3$

[Chemical Formula 11]

(11)

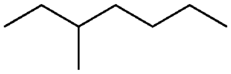

$CH_3CH_2CH(CH_3)CH_2CH_2CH_2CH_3$

[Chemical Formula 12]

(12)

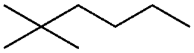

$(CH_3)_3CCH_2CH_2CH_2CH_3$

[Chemical Formula 13]

(13)

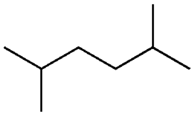

$(CH_3)_2CHCH_2CH_2CH(CH_3)_2$

[Chemical Formula 14]

(14)

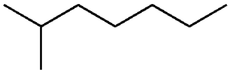

$(CH_3)_2CHCH_2CH_2CH_2CH_2CH_3$

[Chemical Formula 15]

(15)

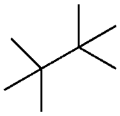

$(CH_3)_3CC(CH_3)_3$

[Chemical Formula 16]

(16)

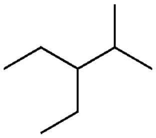

$(CH_3CH_2)_2CHCH(CH_3)_2$

-continued

[Chemical Formula 17]

(17)

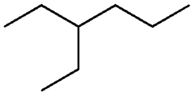

$(CH_3CH_2)_2CHCH_2CH_2CH_3$

[Chemical Formula 18]

(18)

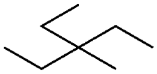

$CH_3CH_2C(CH_3)(CH_2CH_3)_2$

The molecular vibration spectra are not measured for all of the 18 kinds of isomers of octane. Therefore, the inventor determined the optimized structure by performing the quantum chemistry calculation for the 18 kinds of isomers of octane, performed frequency calculation for the determined structure to calculate the reference frequency and the absorption strength, thereby obtaining the molecular vibration spectrum. Then, the inventor calculated the aforementioned similarity matrix based on the acquired molecular vibration spectra. Here, the inventor calculated the similarity matrix using the number of vibrations and the absorption strength in the range of 2800 to 3200 $cm^{-1}$ corresponding the stretching vibration of the C—H bond.

The inventor performed analysis of the organic molecules expressed by the structural formulae 2 to 18 using the organic molecule expressed by the structural formula 1 to verify whether or not the information about the strength of the predetermined property can be acquired. That is, the organic molecule expressed by the structural formula 1 correspond to the second organic molecule described above. The organic molecule expressed by the structural formulae 2 to 18 correspond to the plurality of the first organic molecules described above.

The organic molecule expressed by the structural formula 1 is normal octane. The normal octane has an unbranched main chain (carbon chain) and the main chain carbon number is 8. The organic molecule expressed by the structural formula 1 has the main chain carbon number that is larger than that of the organic molecules expressed by the structural formulae 2 to 17. Further, the organic molecule expressed by the structural formula 1 has stronger linearity than that of the organic molecules expressed by the structural formulae 2 to 17. Therefore, according to the analysis method of the second example embodiment, the order in which the main chain carbon number among the organic molecules expressed by the structural formulae 2 to 17 decreases and information about the order in which the linearity weakens can be acquired.

The inventors determined the order in which 18 kinds of isomers are aligned by generating the Hamiltonian H such that the organic molecule expressed by the structural formula 1 comes at the head of the permutation and then optimizing the Hamiltonian H. As a result of optimizing the Hamiltonian H, a permutation of (structural formula 1)→(structural formula 10)→(structural formula 14)→(structural formula 11)→(structural formula 16)→(structural formula 4)→(structural formula 13)→(structural formula 12)→(structural formula 17)→(structural formula 18)→(structural formula 9)→(structural formula 7)→(structural formula 3)→(structural formula 5)→(structural formula 8)→(structural formula 2)→(structural formula 6)→(structural formula 15) was obtained. In this permutation, focusing on the number of the carbon atoms in the main chain of each isomer, the main chain carbon number is: 8→7→7→7→5→6→6→6→6→5→6→6→5→5→6→5→5→4. The permutation obtained by optimizing the Hamiltonian indicates the permutation in which the molecules having the same number of the carbon atoms in the main chain are aligned locally and the carbon atom number in the main chain decreases as a whole. It can be said that the obtained permutation is a permutation in which the linearity of the main chain becomes weaker.

Further, the inventor performed verification for the case in which the isomer expressed by the structural formula 15 is at the head of the permutation. That is, the inventor used the isomer expressed by the structural formula 15 as the second organic molecule. The isomer expressed by the structural formula 15 has four carbon atoms in the main chain and is the one with the least number of carbon atoms in the main chain out of the 18 kinds of isomers. Optimization was performed for the Hamiltonian H for setting the permutation of the 18 kinds of isomers, and permutation in which the aforementioned permutation was inverted and the main chain carbon number increased was obtained. Further, the isomer expressed by the structural formula 15 is an organic molecule having the strongest branching property among the 18 types of isomers, and it can be said that the permutation indicating an order in which the branching property gradually weakens was obtained.

In the normal analysis of molecular vibration spectra, it is difficult to acquire information about the overall structure of the organic molecules. However, according to the analysis method according to the second example embodiment, information about the structures of the overall organic molecules (e.g. main chain carbon number) is extracted from the spectral region related to the stretching vibration of the C—H bond.

As described above, by applying the combinatorial optimization technique using the Ising model, it is possible to extract information about the structures of the molecules from the molecular vibration spectra. In the analysis of the molecular structure, in addition to the analysis of the molecular vibration spectrum, additional analysis and evaluation is performed, and according to the analysis device according to the second example embodiment, the burden of the additional analysis and evaluation performed in addition to the analysis of the molecular vibration spectrum can be reduced.

The present disclosure is not limited to the above-described example embodiments, and various modifications can be made without departing from the spirit and scope of the present invention.

According to the present disclosure, information about the molecular structures can be extracted from the molecular vibration spectra.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc (registered trademark) or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

What is claimed is:

1. An analysis device comprising:

at least one processor; and at least one memory storing instructions, which when executed by the at least one process, control the analysis device to:

analyze, by applying a combinatorial optimization technique using the Ising model, a molecular vibration spectrum of each of a plurality of organic molecules including a plurality of first organic molecules and a second organic molecule serving as a reference for analyzing a molecule structure of each of the plurality of the first organic molecules;

acquire information about a molecular structure of each of the plurality of the first organic molecules;

generate a similarity matrix representing degrees of similarity among the molecular vibration spectra of the plurality of the organic molecules; and reduce a burden of molecular structure analysis other than molecular vibration spectra analysis by using information obtained by optimizing the Hamiltonian for setting an order of the plurality of the organic molecules such that the higher a degree of similarity between the molecular vibration spectra of organic molecules, the more closely the organic molecules are aligned.

2. The analysis device according to claim 1, wherein the instructions, when executed by the processor, are is further configured to control the analysis device to:

optimize the Hamiltonian using simulated annealing or tabu search.

3. The analysis device according to claim 1, wherein the instructions, when executed by the processor, are further configured to control the analysis device to:

calculate the degrees of similarity among the molecular vibration spectra of the plurality of the organic molecules using Dynamic Time Warping.

4. The analysis device according to claim 1, wherein a range of wavenumbers of the molecular vibration spectra of the plurality of the organic molecules falls within the range of 2800 to 3200 cm−1.

5. The analysis device according to claim 1, wherein the second organic molecule is an organic molecule serving as a reference for analyzing the degree of a predetermined property of the molecular structure of each of the plurality of the first organic molecules, and the instructions, when executed by the processor, are is further configured to control the analysis device to:

acquire information about the order relation of degrees of the predetermined property of the plurality of organic molecules.

6. The analysis device according to claim 5, wherein the predetermined property is a property related to linearity, branching property, or a carbon number in the main chain.

7. An analysis method comprising causing a computer to execute the processes of:

analyzing, by applying a combinatorial optimization technique using the Ising model, a molecular vibration spectrum of each of a plurality of organic molecules including a plurality of first organic molecules and a second organic molecule serving as a reference for analyzing a molecule structure of each of the plurality of the first organic molecules;

acquiring information about a molecular structure of each of the plurality of the first organic molecules;

generating a similarity matrix representing degrees of similarity among the molecular vibration spectra of the plurality of the organic molecules; and reducing a burden of molecular structure analysis other than molecular vibration spectra analysis by using information obtained by optimizing the Hamiltonian for setting the order of the plurality of the organic molecules such that the higher a degree of similarity between the molecular vibration spectra of organic molecules, the more closely the organic molecules are aligned.

8. The analysis device according to claim 1, further comprising a quantum chip configured to perform quantum annealing to optimize the Hamiltonian.

9. A non-transitory computer readable medium storing a program for causing a computer to execute the processes of:

analyzing, by applying a combinatorial optimization technique using the Ising model, a molecular vibration spectrum of each of a plurality of organic molecules including a plurality of first organic molecules and a second organic molecule serving as a reference for analyzing a molecule structure of each of the plurality of the first organic molecules;

acquiring information about a molecular structure of each of the plurality of the first organic molecules;

generating a similarity matrix representing degrees of similarity among the molecular vibration spectra of the plurality of the organic molecules; and reducing a burden of molecular structure analysis other than molecular vibration spectra analysis by using information obtained by optimizing the Hamiltonian for setting the order of the plurality of the organic molecules such that the higher a degree of similarity between the molecular vibration spectra of organic molecules, the more closely the organic molecules are aligned.

* * * * *